United States Patent [19]

Sanbayashi

[11] Patent Number: 4,990,951
[45] Date of Patent: Feb. 5, 1991

[54] IMAGE FORMING APPARATUS HAVING FUNCTION FOR CONTROLLING SHUTTER BY A PULSE

[75] Inventor: Takeshi Sanbayashi, Tokyo, Japan
[73] Assignee: Kabushiki Kaisha Toshiba, Kawasaki, Japan
[21] Appl. No.: 213,306
[22] Filed: Jun. 29, 1988
[30] Foreign Application Priority Data Jun. 30, 1987 [JP] Japan ................. 62-163074

[51] Int. Cl.⁵ .......................................... G03B 27/52
[52] U.S. Cl. ........................ 355/40; 355/74; 355/244
[58] Field of Search ................. 355/43–45, 355/71, 14 R, 14 E, 74, 40, 77, 244

[56] References Cited

U.S. PATENT DOCUMENTS

| 4,340,295 | 7/1982 | Nakamura | 355/244 |
| 4,512,657 | 4/1985 | Sakato | 355/71 |
| 4,693,596 | 9/1987 | Shigaki | 355/68 X |
| 4,708,464 | 11/1987 | Otsuki et al. | 355/74 X |
| 4,724,464 | 2/1988 | Umeda et al. | 355/40 |
| 4,786,945 | 11/1988 | Sambayashi | 355/44 |
| 4,821,067 | 4/1989 | Oushiden et al. | 355/14 E |
| 4,835,576 | 5/1989 | Komori et al. | 355/40 |

FOREIGN PATENT DOCUMENTS

| 3020687 | 12/1980 | Fed. Rep. of Germany . |
| 3442028 | 5/1985 | Fed. Rep. of Germany . |
| 3637062 | 5/1987 | Fed. Rep. of Germany . |
| 60-177336 | 9/1985 | Japan | 355/244 |
| 62-265679 | 11/1987 | Japan . |

Primary Examiner—L. T. Hix
Assistant Examiner—D. Rutledge
Attorney, Agent, or Firm—Cushman, Darby & Cushman

[57] ABSTRACT

In an image forming apparatus such as an image reader printer according to the present invention, light is radiated onto an original image by a light source, and a projection image corresponding to the irradiated original image is displayed on a projection screen. Cursors for designating a predetermined region of the projection image corresponding to the predetermined region of the original image are slidably displayed. When the original image is to be copied, the original image irradiated with the radiation light from the light source is optically scanned by a pivot mirror, and the scanning light is shielded by a shutter of a shutter unit only for a predetermined period of time corresponding to the predetermined region designated by the cursors. The shutter is controlled by a controller in accordance with the count of pulse signals generated by a generator that generates the pulse signals having a predetermined period, and shields the scanning light. Upon reception of the scanning light, and an image corresponding to the original image only within the designated region is formed on paper by an image forming unit comprising a photoconductive drum, a developing system, and the like.

44 Claims, 6 Drawing Sheets

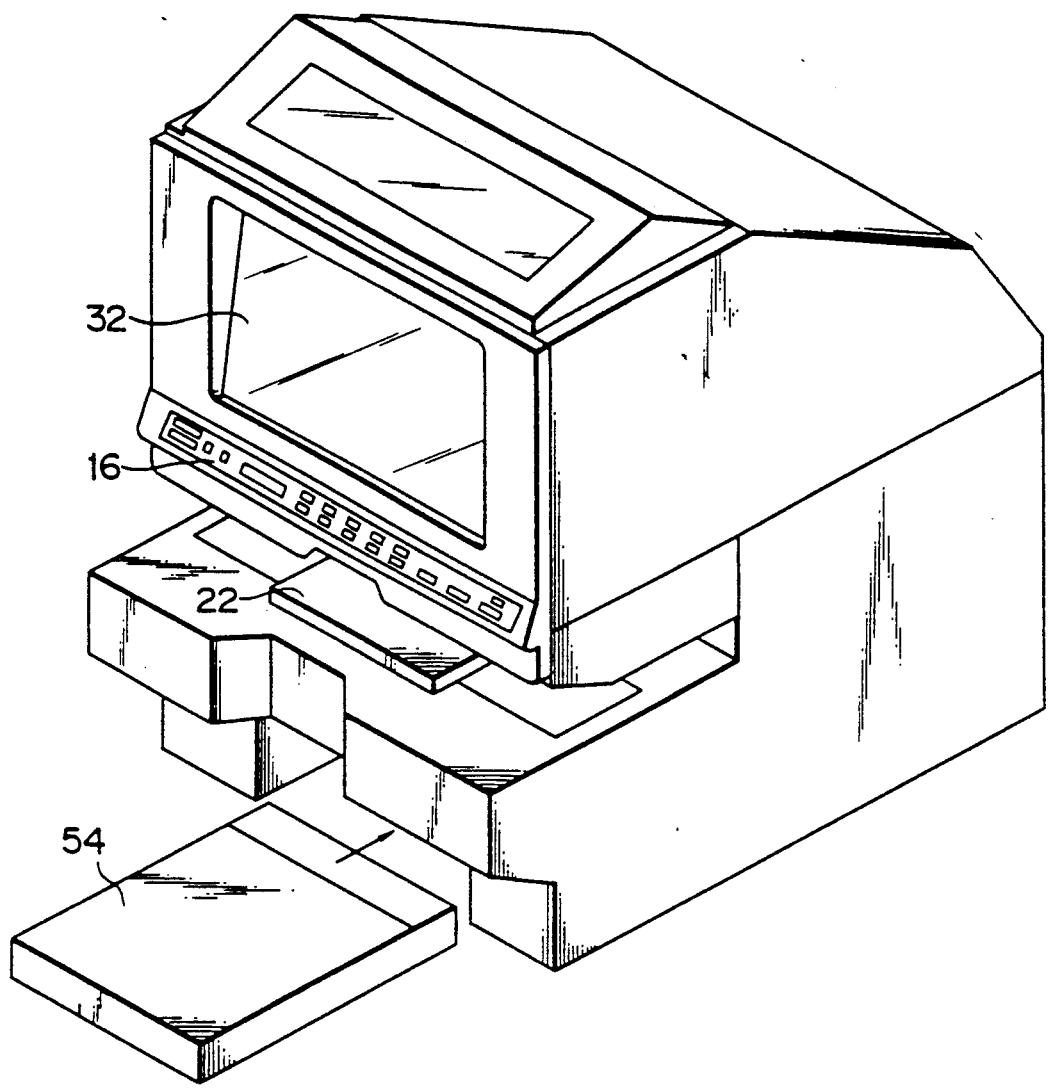
F I G. 1

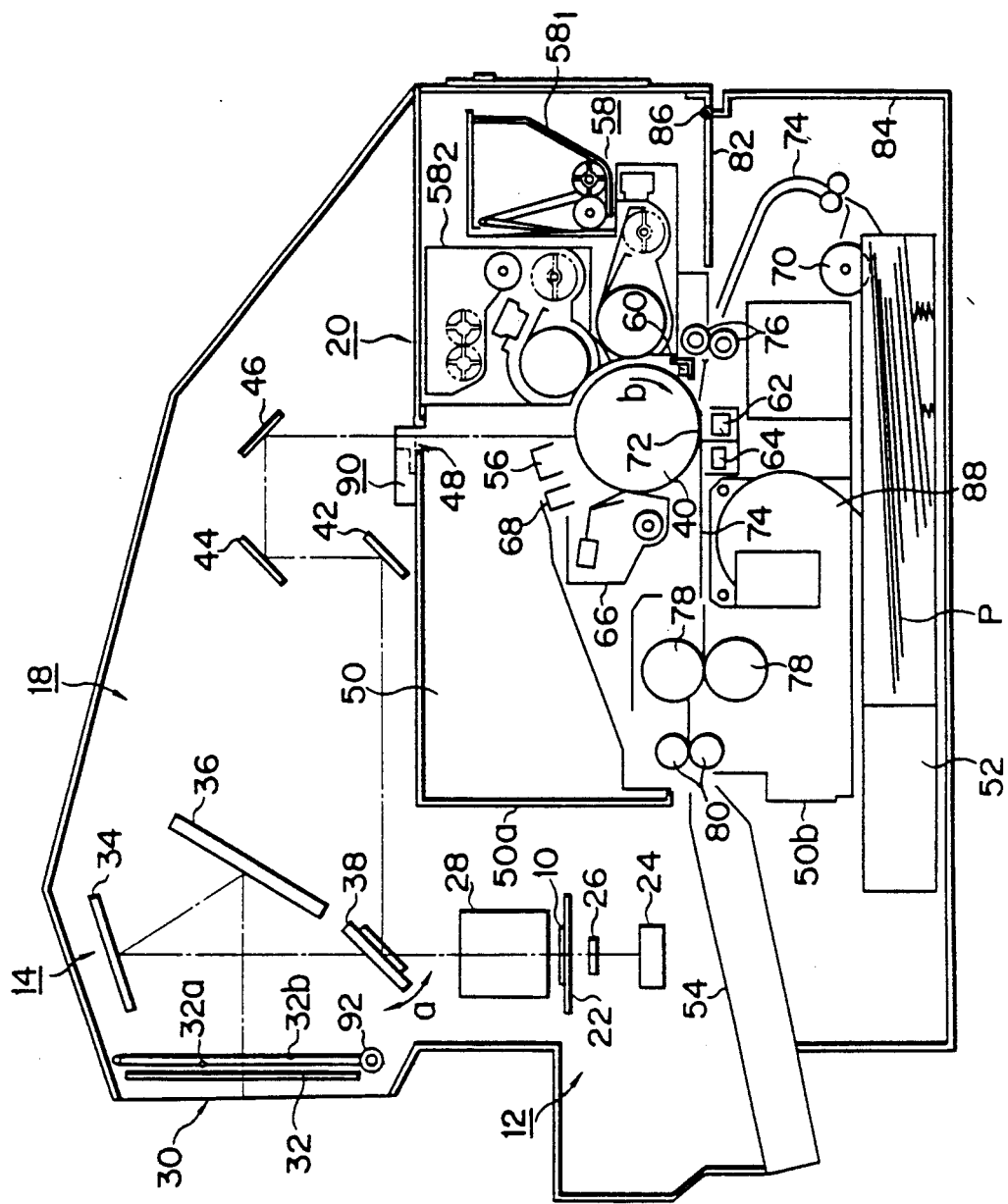
F I G. 2

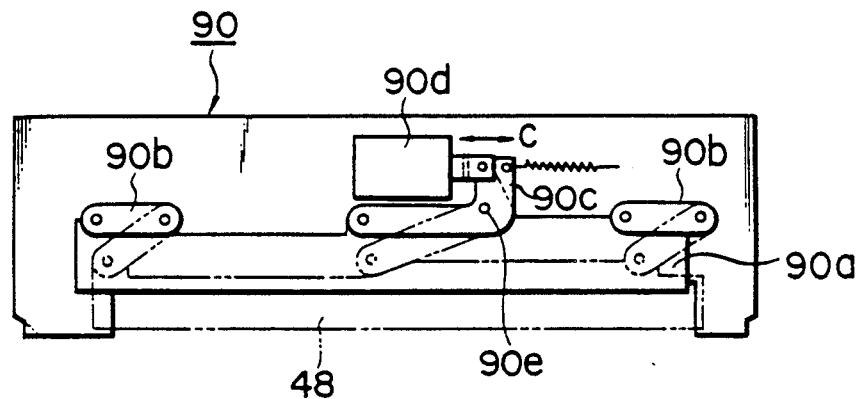
F I G. 5
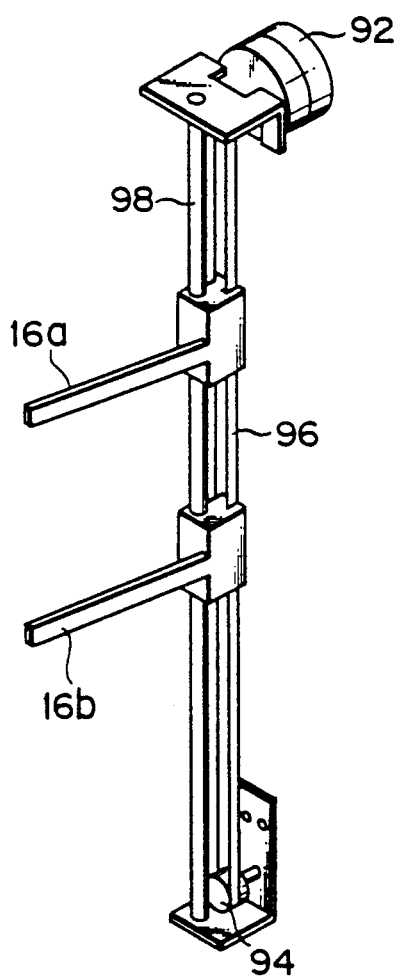
F I G. 6

IMAGE FORMING APPARATUS HAVING FUNCTION FOR CONTROLLING SHUTTER BY A PULSE

BACKGROUND OF THE INVENTION

1. Field of the Invention

The present invention relates to an image forming apparatus and, more particularly, to an image forming apparatus, such as a microfilm reader printer, which controls a shutter by means of a pulse.

2. Description of the Related Art

Microfilm is a medium which is widely used for recording and storing a broad variety of information. An image forming apparatus such as a microfilm reader printer is used to project the microfilm and record the microfilm information on paper as required.

For example, in the microfilm reader printer, an image on the microfilm is enlarged and displayed as a projection image, on a projection screen by light from a light source. When the image displayed on the projection screen, i.e., the image on the microfilm, is to be copied, the projection light from the light source is radiated on the microfilm, and the radiated light is focused on a photoconductive drum as an image carrier to form an electrostatic latent image. The latent image is developed by a developing unit, transferred onto a copy sheet by a transfer charger, and fixed on the sheet by a fixing unit. Thereafter, the sheet is discharged from the microfilm reader printer.

In an image forming apparatus such as an image reader printer of this type that generally performs reversed development, regions before and after the leading and trailing ends, respectively, of an effective image are unnecessarily developed. In order to prevent this, in an image forming apparatus disclosed in, e.g., Japanese Pat. Application No. 61-109193, a shutter unit is provided for shielding scanning light from a light source as an exposure means, so that only a portion of the photoconductive drum corresponding to the effective image is exposed.

When the scanning light shielding operation by the shutter unit is controlled in accordance with an arbitrary image region, only a desired image region may be copied (trimmed). However, if an inexpensive AC motor is used as a scanning drive means of an image scanning mechanism instead of a DC motor having a high scanning precision, the following problems occur. The rotating speeds of AC motors vary from one motor to another. Therefore, the shutter unit is controlled in accordance with the rotating speed of each AC motor based on a required image scanning distance. However, in this case, the scanning start/end point of the required image does not sometimes correctly match the opening/closing operation of the shutter, with the result that the required image region and the image copied on the sheet may not always match.

SUMMARY OF THE INVENTION

Accordingly, it is an object of the present invention to provide an image forming apparatus wherein a time lag does not occur between image scanning and shutter control even when an inexpensive AC motor is used as an image scanning means, thereby ensuring that a desired image region is copied with high precision.

According to an aspect of the invention, there is provided an apparatus for forming on image on an image carrier in accordance with an original comprises means for illuminating the original, means for projecting an image of the original illuminated by the illuminating means, means for generating a data representing an image formation region of the image of the original projected by the projecting means, means for directing light from the original, which is illuminated by the illuminating means, onto the image carrier, and means for permitting the passage of the light directed by the directing means for a period of time in accordance with the data generated by the generating means so as to form on the image carrier an image corresponding to the original image projected by the projecting means.

BRIEF DESCRIPTION OF THE DRAWINGS

These and other features and advantages of the present invention will become more apparent from the following detailed description of an exemplary embodiment as illustrated in the accompanying drawings, of which:

FIG. 1 is a perspective view showing an outer appearance of a microfilm reader printer as an image forming apparatus according to an embodiment of the present invention;

FIG. 2 is a schematic cross-sectional view of the microfilm reader printer shown in FIG. 1;

FIG. 5 is a diagram showing a scanning light shutter mechanism of the microfilm reader printer;

FIG. 6 shows a cursor-moving mechanism of the microfilm projector;

DETAILED DESCRIPTION OF THE PREFERRED EMBODIMENT

Figure 3:
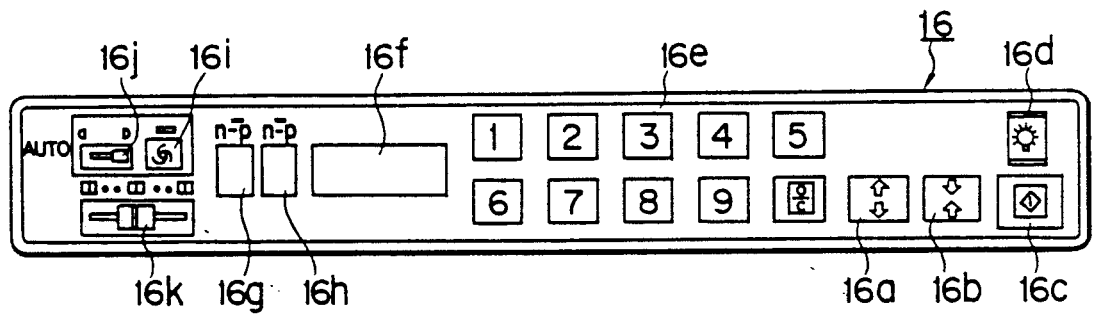
FIG. 3 is a view showing the outer appearance of an operation panel.

A preferred embodiment of the present invention will now be described, with reference to the accompanying drawings.

First, an image reader printer to which the image forming apparatus of the present invention is applied, will be briefly described, with reference to FIGS. 1 and 2. The image reader printer has film set unit 12, projecting unit 14, operation panel 16, scanning light guide unit 18, and image forming unit 20. Microfilm 10 or the like is set in film set unit 12, and is projected by projecting unit 14. Scanning light guide unit 18 guides scanning light generated by projecting unit 14. Image forming unit 20 forms an image based on the scanning light guided by guide unit 18.

As is shown in FIG. 3, operation panel 16 includes cursor move keys 16a and 16b, copy start key 16c, standby key 16d, copy sheet number keys 16e, and display section 16f. Cursor move keys 16a and 16are used to move the cursor (to be described later) of the microfilm projector, copy start key 16c designates the starting of a copy operation, standby key 16d turns the light source on and off, copy sheet number keys 16e are used to designate the number of copies to be made, and display section 16f displays information instructing toner replenishment, paper jamming, copy standby, copy OK, the number of copies made, and the like. Operation panel 16 also includes N→P and P→P development selection keys 16g and 16h, automatic exposure key 16i, manual exposure control key 16j, and copy density control key 16k. Selection keys 16g and 16h are used to select image development from negative to positive and from positive to positive, respectively.

The arrangement and operation of each of units 12, 14, 18, and 20 constituting the image reader printer will now be described, beginning with film set unit 12.

Film set unit 12 includes film table 22 on which is placed microfilm 10, projecting light source 24, which is located under table 22, condenser lens 26, arranged above light source 24, and lens case 28, located above table 22. Light from light source 24 is radiated, through condenser lens 26, onto microfilm 10 placed on film table 22, table 22 being movable in two-dimensions on a plane above condenser lens 26, by the operation of a lever or the like (not shown).

Next, the arrangement and operation of projecting unit 14 will be described. Projection unit 14 has a screen projector. In projecting unit 14, microfilm projector 30 is integrally formed on the upper portion of an image forming section main body (to be described later). A projection image is displayed on projection screen 32 based on projection light incident through lens case 28. In addition to projection screen 32, projecting unit 14 has first and second mirrors 34 and 36 which sequentially reflect the light from light source 24, thereby projecting an optical image onto screen 32. Pivot mirror 38 is arranged between lens case 28 and first mirror 34 at the incident end side of projecting unit 14. Mirror 38 can reciprocate in a direction perpendicular to the sheet surface of FIG. 2 and its mirror surface can pivot in the direction indicated by arrow a in FIG. 2.

When an image is projected onto projection screen 32, pivot mirror 38 is stopped at a position deviated from a position above lens case 28 so as not interfere with light incident on first mirror 34. In contrast to this, when image forming unit 20 performs copying, mirror 38 is located above lens case 28. The inclination angle of the mirror surface of mirror 38 is changed by pivoting in the direction of arrow a to sequentially scan the projection light, thereby guiding the projection light to scanning light guide unit 18. Pivot mirror 38 is driven to reciprocate by a motor (to be described later).

Figure 4:
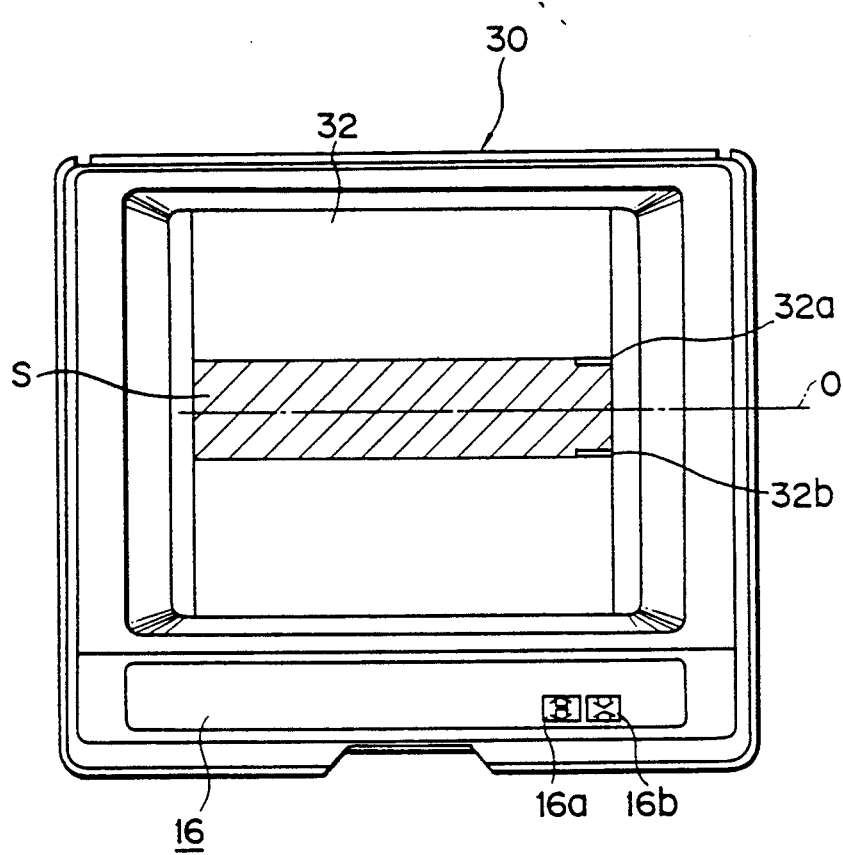
FIG. 4 is a schematic front view of a microfilm projector of the microfilm reader printer.

Cursors 32a and 32b are arranged on the right end of projection screen 32 to designate a copy region of a display image projected on screen 32, as shown in FIG. 4. Cursors 32a and 32b can perform region designation by setting boundaries having any width in the vertical direction of the display surface of screen 32 and has a length of, e.g., 30 mm in the horizontal direction of the display surface. When cursor move keys 16a and 16b operation panel 16 described above are operated, cursors 32a and 32b are vertically, symmetrically moved in the opposite directions by a cursor stepping motor (to be described later). A region on screen 32 sandwiched by cursors 32a and 32b is designated as copy image region S. Note that reference symbol O in FIG. 4 denotes a central line of screen 32 in the vertical direction.

Scanning light guide unit 18 guides light, reflected and scanned by pivot mirror 38, to photoconductive drum 40 (to be described later) of image forming unit 20 to form an image. Guide unit 18 comprises third, fourth, and fifth mirrors 42, 44, and 46. The scanning light passes through scanning light incident slit 48 formed in an upper portion of image forming unit 20 through mirrors 42, 44, and 46, and is guided onto drum 40.

The arrangement and operation of image forming unit 20 will be described. Feed cassette 52 stacking paper P therein is mounted on the bottom of main body 50 of image forming unit 20. Receiving tray 54 is mounted in the left side surface (the front side of the microfilm reader printer) of image forming unit 20. Photoconductive drum 40 as an image carrier is set at substantially the central portion of main body 50. Drum 40 can rotate in the direction indicated by arrow b in FIG. 2. Main charger 56 as a charging means, developing system 58 comprising reversed and normal developing units $58_1$ and $58_2$, pre-transfer discharge unit 60, transfer charger 62 as a transfer means, separation charger 64, cleaning unit 66, and discharge lamp 68 are sequentially arranged around drum 40 in the order named.

Paper convey path 74 is defined in a lower portion of main body 50. Paper P automatically taken up from feed cassette 52 by feed roller 70 is guided along paper convey path 74 to receiving tray 54 through image forming section 72 between drum 40 and transfer charger 62. Resist roller pair 76 is arranged on convey path 74 at the upstream side of image forming section 72, and heat-roller pair 78 and exit roller pair 80 constituting a fixing unit are arranged on convey path 74 at the downstream side of image forming section 72.

When photoconductive drum 40 is rotated in the direction of arrow b in FIG. 2, its surface is uniformly charged by main charger 56, and scanning light from scanning light guide unit 18 is sequentially focused on it, thereby forming an electrostatic latent image. The latent image is developed by either reversed or normal developing unit $58_1$ or $58_2$ of developing system 58 and supplied to transfer charger 62 side.

Paper P supplied from feed cassette 52 is separated from photoconductive drum 40 by separation charger 64 and guided to heat-roller pair 78 along paper convey path 74. A transfer image is fixed on paper P by heat-roller pair 78, and the paper is discharged to receiving tray 54 by exit roller pair 80. The residual carriers remaining on drum 40 after the image is transferred onto paper P are erased by discharge lamp 68, the residual toner is removed during developing in this embodiment, and a next copy operation is waited for.

One end of each of upper and lower frames 82 and 84 of main body 50 is pivotally supported on support shaft 86. In upper frame 82, main charger 56, developing system 58, discharge lamp 68, and so on are mounted through appropriate means around photoconductive drum 40 to constitute upper unit 50a. In lower frame 84, mechanisms such as feed cassette 52, transfer charger 62, separation charger 64, heat-roller pair 78, exit roller pair 80, and receiving tray 54; main motor 88; and so on are mounted through appropriate means to constitute lower unit 50b. Main motor 88 drives pivot mirror 38 and photoconductive drum 40 in synchronism with each other. Upper frame 82 can be opened or closed (can be called a clamshell structure) substantially along paper convey path 74 by pivoting about pivot shaft 86. As a result, paper jamming can be easily recovered and maintenance can be easily performed.

Shutter unit 90 is arranged on scanning light incident slit 48 of upper frame 82 of main body 50 of image forming unit 20 to control incidence of the image scanning light. Shutter unit 90 comprises shutter 90a for closing scanning light incident slit 48, two link mechanisms 90b and one link mechanism 90c for operating shutter 90a, and shutter solenoid 90d for driving link mechanism 90c and movable in the direction indicated by arrow c in FIG. 5. When solenoid 90d is deenergized, it is moved to the right in FIG. 5. Then, link mechanism 90c is rotated (from the position indicated by a two-dot chain line) to the position indicated by a solid line about shaft 90e. Along with the movement of link mechanism 90c, link mechanisms 90b are also moved. In this manner, shutter 90a is moved from the position indicated by a two-dot chain line to the position indicated by a solid line and is thus opened. In contrast to this, when shutter solenoid 90d is energized, it is moved to the left. Links 90b and 90c are moved from the positions indicated by solid lines and to the positions indicated by two-dot chain lines. Thus, shutter 90a is moved to the position indicated by the two-dot chain line, thus closing slit 48.

FIG. 6 shows the moving mechanism of copy region designating cursors 32a and 32b of microfilm projector 30 described above. Cursors 32a and 32b are mounted perpendicularly to belt 96 extended between the rotating shaft of cursor stepping motor 92 and roller 94, and vertically move along cursor guide 98. Belt 96 forms two parallel ways between motor 92 and roller 94. Of cursors 32a and 32b, cursor 32a is mounted on one way of belt 96, and cursor 32b is mounted on the other way of belt 96. As a result, cursors 32a and 32b are vertically, symmetrically moved in the opposite directions along with the travel of belt 96.

Figure 7:
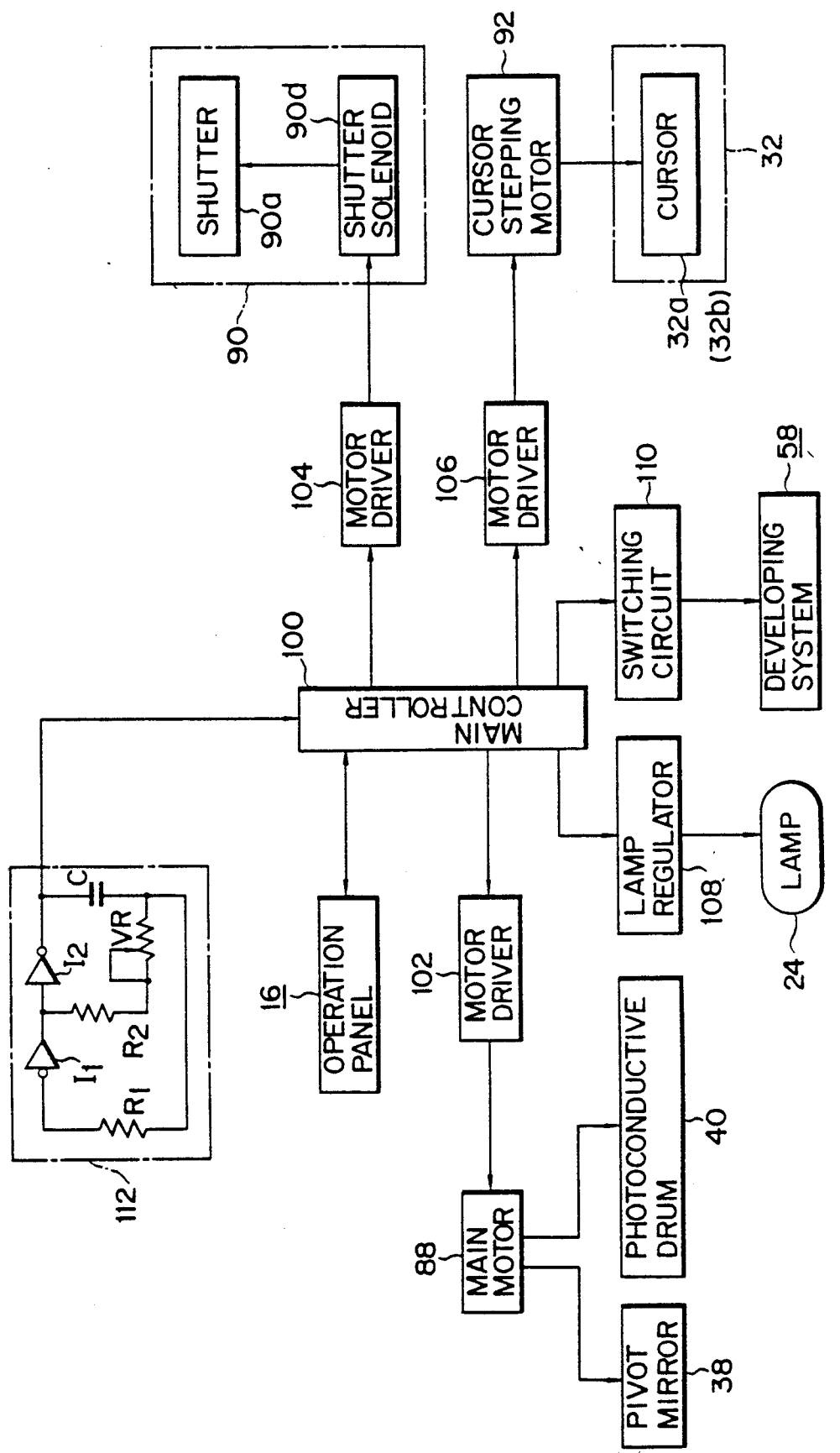
FIG. 7 is a block diagram of a control system.

FIG. 7 schematically shows the arrangement of the control system of the microfilm reader printer. Main controller 100 comprising, e.g., a 1-chip microprocessor, receives various types of key operation signals from operation panel 16. In response to the various types of key operation signals, controller 100 controls main motor 88, shutter solenoid 90d, cursor stepping motor 92, and the like through motor drivers 102, 104, and 106, respectively, and performs various other control operations of the respective portions. More specifically, controller 100 also controls light source 24 through lamp regulator 108, developing system 58 comprising reversed and normal developing units $58_1$ and $58_2$ through switching circuit 110, and generator 112 for setting an operation timing of shutter solenoid 90d. Main motor 88 drives pivot mirror 38 and photoconductive drum 40 described above. The operation timing of solenoid 90d is set based on the count of pulse signals supplied from generator 112. Generator 112 comprises inverters $I_1$ and $I_2$, resistors $R_1$ and $R_2$, capacitor C, and variable resistor VR. When variable resistor VR is adjusted, the period of pulse signals can be changed. Switching circuit 110 switches developing system 58 between reversed and normal developing units $58_1$ and $58_2$ in accordance with the selection made by N→P or P→P development selection key 16g or 16h on operation panel 16.

When, e.g., an image is to be displayed on microfilm projector 30, if cursor move keys 16a and 16b of operation panel 16 are operated, main controller 100 calculates the relative target positions of cursors 32a and 32b on screen 32 from the number of motor drive pulses for stepping motor 92. Then, controller 100 calculates an image scanning time required for reaching an image scanning position, i.e., a scanning start position, on microfilm 10 which corresponds to the two cursor target positions and which is scanned by rotation of pivot mirror 38. In other words, an image scanning distance (scanning rate) per unit time by rotation of mirror 38 is obtained in accordance with the rotating speed of main motor 88 driving mirror 38. When an image scanning distance corresponding to the cursor designation positions is divided by the scanning rate, the image scanning time required for reaching the two cursor designation positions is obtained.

Subsequently, at the time of the image copying operation, main controller 100 turns on shutter solenoid 90d by motor driver 104 to close shutter 90a, thereby closing scanning light incident slit 48. Then, the pulse signals from generator 112 and corresponding in number to the image scanning time corresponding to the designation position designated by one cursor (32a or 32b) are counted. Shutter solenoid 90d is deenergized to drive shutter 90a, thereby opening slit 48. Image scanning within the range designated by the cursor (32a or 32b) is ended, and the pulse signals from generator 112 and corresponding in number to the image scanning time corresponding to the position designated by the other cursor (32b or 32a) are counted. Then, shutter solenoid 90d is energized again by motor driver 104 to close slit 48, thereby preventing exposure on drum 40.

The fundamental period of pulse signals generated by generator 112 is set to a fraction of the image scanning time for scanning the designated image region corresponding to a minimum step of cursors 32a and 32b, i.e., one-pulse rotation of stepping motor 92. For example, assuming that the minimum step of cursors 32a and 32b is 2.5 mm and that the image scanning rate is 100 mm/sec, the scanning time of the image region corresponding to the minimum step is 2.5/100=0.025 sec =25 msec. In this case, assuming that $\frac{1}{8}$ of the unit image scanning time is the pulse signal period, when the pulse signals numbering 8 times that of the motor drive pulses of stepping motor 92 for moving cursors 32a and 32b are counted, an image scanning position corresponding to the target cursor position can be detected.

With the microfilm reader printer having the above arrangement, when only a desired partial region of a film image projected on screen 32 of microfilm projector 30 is to be copied, the following operation is performed.

Figure 8:
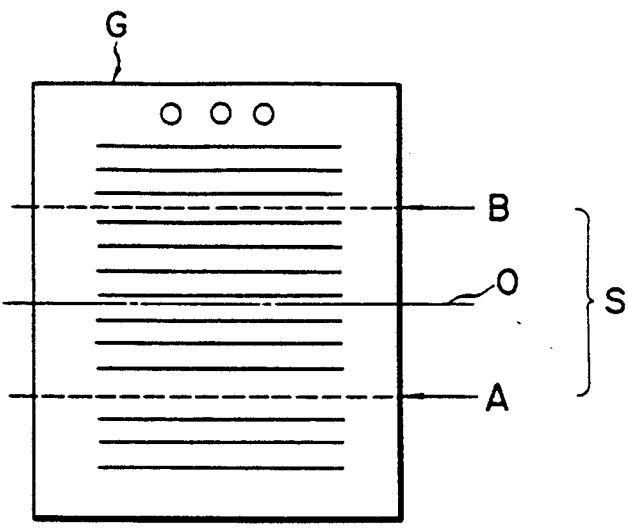
FIG. 8 shows a designated copy image region of an original of microfilm.
Figure 9:
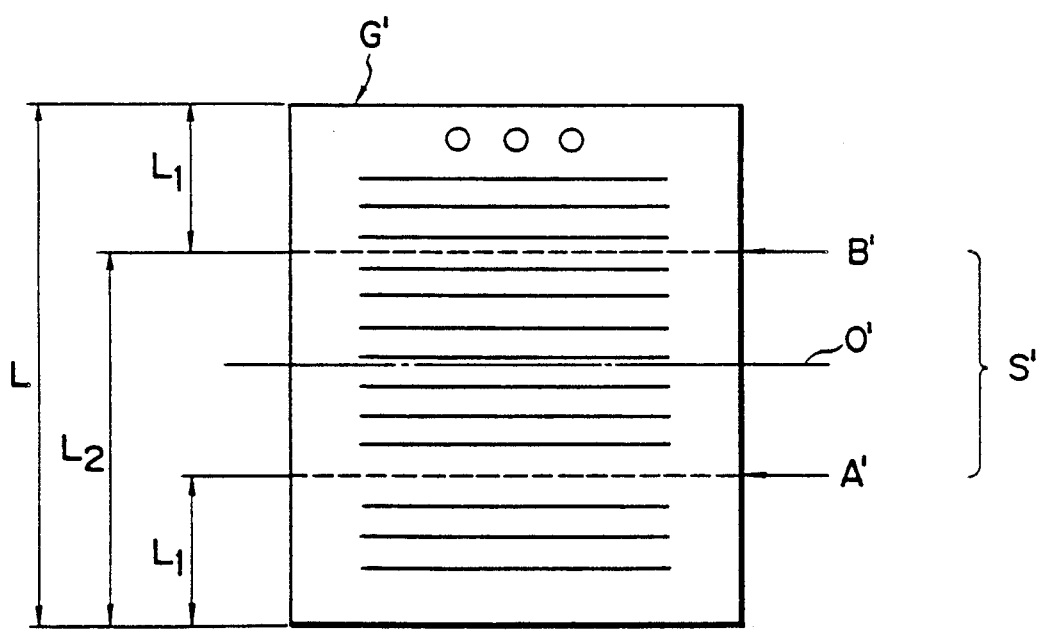
FIG. 9 shows a display image displayed on the microfilm projector and showing the opening/closing positions of the scanning light shutter mechanism in correspondence with the designated copy image region of the original of the microfilm shown in FIG. 8.

Assume that original G as shown in FIG. 8 is projected as display image G' on screen 32 of microfilm projector 30, as shown in FIG. 9. Cursor move keys 16a and 16b are operated to vertically move cursors 32a and 32b, thus designating desired copy image region S' (ranging from A' to B' through central line O'). Copy image region S' corresponds to copy image region S (ranging from A to B through central line O) of original G on microfilm 10. Main controller 100 calculates, from the motor drive pulses for stepping motor 92, the pulse signals corresponding to distances $L_1$ and $L_2$ from display image G' to relative positions A' and B' of copy image region S' and generated from generator 112. Since image scanning processing accompanying the following image copy operation is started from the lower end of display image G', distance $L_1$ represents the distance between the lower end and exposure start position A', and distance $L_2$ represents the distance between the lower end and exposure end position B'. When $L_1=35$ mm and $L_2=115$ mm, since the image scanning distance per unit time is 2.5 mm, the count of pulses corresponding to $L_1$ is $(35/2.5) \times 8 = 112$ and that corresponding to $L_2$ is $(115/2.5)=8=368$.

After copy image region S' on projection screen 32 (i.e., copy image region S on microfilm 10) is designated, an operation button (not shown) is depressed. Then, pivot mirror 38, which has been shifted from a position above lens case 28 at the time of projecting display image G', is returned to the position above lens case 28. In this state, copy start key 16c of operation panel 16 is depressed. Then, main motor 88 is operated by motor driver 102 to rotate pivot mirror 38 and photoconductive drum 40 in synchronism with each other, and image scanning through microfilm 10 is started. When image scanning is started, shutter solenoid 90d is energized by main controller 100 and thus scanning light incident slit 48 is closed by shutter 90a. In this case, visual light radiated upon rotation of mirror 38 is shielded by shutter 90a, and exposure on drum 40 is not performed.

Thereafter, when the image scanning position of microfilm 10 reaches lower end position A of copy image region S corresponding to the position designated by cursor 32b, this time point is detected from the count of pulse signals from generator 112 which is obtained in advance by main controller 100 and which corresponds to distance $L_1$ (112 pulses) between the lower end and exposure start position A. Controller 100 then deenergizes shutter solenoid 90d to open shutter 90a of scanning light slit 48. As a result, the scanning light of microfilm 10 is not shielded by shutter 90a, and exposure on drum 40 is performed from a position corresponding to lower end A of copy image region S.

When the image scanning position reaches upper position B of copy image region S designated by cursor 32a, this time point is detected from the count of pulse signals from generator 112 which is obtained in advance by main controller 100 and which corresponds to distance $L_2$ (368 pulses) between the lower end and exposure end position B. Controller 100 then energizes shutter solenoid 90d again to close shutter 90a, thus closing scanning light incident slit 48. As a result, the image scanning light of microfilm 10 is shielded by shutter 90a again, and exposure on drum 40 is not performed from upper position B of copy image region S.

If a phase-controlled AC motor is used as main motor 88, distances $L_1$ and $L_2$ of exposure start positions A and B of copy image region S may not match the opening/closing timings of shutter 90a because of the variation in image scanning rate. In this case, the period of generator 112 to generate the pulse signals may be adjusted in accordance with the time lag. More specifically, when the pulse generation period of generator 112 is increased, the shutter timing is delayed. On the contrary, when the pulse generation period is shortened, the shutter timing is advanced. In this manner, a difference between an exposure start/end position and shutter open/close timing during image scanning can be corrected, and a copy image precisely coinciding with copy image region S can be obtained.

The operation of the overall microfilm reader printer of this embodiment will be briefly described.

A film projecting operation will be firstly described. For film projection, microfilm 10 is placed and set on film table 22. Standby key 16d on operation panel 16 is depressed to turn on projecting light source 24 (which is normally ON). Then, light is radiated by light source 24 onto microfilm 10 through condenser lens 26 and passes through first and second mirrors 34 and 36 to be focused on projection screen 32 of microfilm projector 30, thus forming an enlarged visual image of microfilm 10.

An operation for copying the enlarged image of microfilm 10 on paper P will be described. Note that an ordinary copying operation will be described here and a copying operation for obtaining a desired copy image region as described above will be omitted.

Assume that copy standby is displayed on display portion 16f of operation panel 16. Standby key 16d is turned off to turn off light source 24, and it is waited until the heater in image forming unit 20 is warmed up. During this period of time, an operation button (not shown) is depressed to move pivot mirror 38 in a direction perpendicular to the sheet surface of FIG. 2, thus locating setting pivot mirror 38 above lens case 28. When the heater is warmed up and copy OK is displayed on display portion 16f, standby key 16d is turned on. Then, either N→P or P→P development selection key 16g or 16h is selected in accordance with the type of microfilm 10. A desired number of copies is selected by copy sheet number keys 16e, and copy start key 16c is depressed to start a copying operation. Then, pivot mirror 38 is rotated by main motor 88 in synchronism with photoconductive drum 40, which is rotated in the direction of arrow b in FIG. 2, and projection light from light source 24 is converted into scanning light by mirror 38, thus scanning the image on microfilm 10.

The surface of photoconductive drum 40 is charged by main charger 56, and an electrostatic latent image is formed on drum 40 by the scanning light. When drum 40 is rotated to a position opposing developing system 58, a positive toner image is formed from the latent image of microfilm 10 by reversed or normal developing unit $58_1$ or $58_2$. Developing units $58_1$ and $58_2$ can be switched in accordance with the type of microfilm 10, as described above, by depressing N→P or P→P development selection keys 16g and 16h on operation panel 16.

The toner image is transferred onto paper P taken up from feed cassette 52 by transfer charger 62 in accordance with N→P or P→P development. Image-transferred paper P is separated from photoconductive drum 40 by separation charger 64. Then, paper P is guided to heat-roller pair 78 along paper convey path 74. The transfer image is fixed by fusing by heat-roller pair 78, and paper P is discharged to receiving tray 54 on the front side of the microfilm reader printer by exit roller pair 80.

The residual toner remaining on photoconductive drum 40 is recovered by cleaning unit 66 and the surface of drum 40 is cleaned. Then, the residual image on drum 40 is erased by discharge lamp 68.

When an abnormal state such as jamming of paper P occurs on paper convey path 74, the operator can notice it through paper jamming indication on display portion 16f or the like. The operator then opens a panel or the like on the side surface of the microfilm reader printer and opens upper frame 82 by pivoting it about support shaft 86, thus easily performing maintenance such as removing paper P on path 74.

In the microfilm reader printer having the above arrangement, shutter 90a of scanning light incident slit 48 is opened/closed to correspond to desired copy image region S, so that only the desired image region can be copied (trimmed) on projection screen 32 displaying an image of microfilm 10. At the same time, the open/close timing of shutter 90a is controlled in synchronism with the count timing of the pulse signals generated by frequency-variable generator 112. Therefore, it is possible to cause a cursor designation region to precisely coincide with a copy region by precisely matching an image exposure timing with a change in image scanning rate accompanying a variation in rotating speed of main motor 88.

In this embodiment, shutter 90a is operated to correspond to an image region designated by cursors 32a and 32b to open/close light scanning incident slit 48, thus copying only a desired image region. However, the present invention is not limited to this. For example, when shutter solenoid 90d is controlled to open and close shutter 90a at lower and upper end positions A and B, respectively, of region S shown in FIG. 8, a copy excluding only an unnecessary image region (in the vicinity of central line O in FIG. 8) can be obtained (masking can be performed).

In an application of open/close control of scanning light shutter 90a in accordance with region designation, a plurality of portions within a display image can be selectively copied (trimmed or masked).

Furthermore, in this embodiment, the generation period of the pulse signals by generator 112 is set to be a fraction of the unit image scanning time corresponding to the minimum step of cursors of 32a and 32b. However, the generation period can be set to be an integer multiple of a unit image scanning time.

As described above, according to the present invention, even when an inexpensive AC motor is used as an image scanning means, a time lag does not occur between image scanning and shutter control, and a necessary image region can be copied with a high precision.

What is claimed is:

1. An apparatus for forming an image on an image carrier in accordance with an original, comprising:
   means for illuminating the original;
   means for projecting an image of the original illuminated by said illuminating means;
   means for generating data representing an image formation region of the image of the original projected by said projecting means, including:
   first and second inverters connected in series with each other to form a series circuit, a first resistor and a capacitor connected in series with each other between two ends of the series circuit made up of said first and second inverters, and a second resistor and a variable resistor connected in series with each other, between a node of said first and second inverters and a node of said first resistor and said capacitor;
   means for directing light from the original, which is illuminated by said illuminating means, onto the image carrier; and
   means for permitting the passage of the light directed by said directing means for a period of time in accordance with the data generated by said generating means so as to form on the image carrier an image corresponding to the original image projected by said projecting means.

2. An apparatus according to claim 1, wherein said generating means is of a frequency variable type.

3. An apparatus according to claim 2, further comprising means for designating boundaries of the image formation region.

4. An apparatus according to claim 3, further comprising operating means for moving said designating means in a designated direction on said projecting means.

5. An apparatus according to claim 4, wherein said permitting means comprises a shutter member for directly shielding the scanning light, a link mechanism having one end thereof mounted on said shutter member, and a solenoid member mounted on the other end of said link mechanism.

6. An apparatus according to claim 5, wherein said projecting means comprises a projection screen.

7. An apparatus according to claim 4, wherein the image formation region is that area of the projected image that is within the boundaries which are designated by said designating means.

8. An apparatus according to claim 4, wherein the image formation region is the whole of the projected image excluding an area within the boundaries which are designated by said designating means.

9. An apparatus according to claim 7, wherein said designating means has at least two cursors.

10. An apparatus according to claim 8, wherein said designating means has at least two cursors.

11. An apparatus according to claim 9, wherein said two cursors are slidably, symmetrically moved with respect to a central line of said projecting means.

12. An apparatus according to claim 10, wherein said two cursors are slidably, symmetrically moved with respect to a central line of said projecting means.

13. An apparatus according to claim 4, wherein said generating means has a pulse signal period which is an integer multiple or a fraction of an image scanning time per unit designation region designated by said designating means.

14. An apparatus according to claim 4, wherein said generating means has a pulse signal period which can be varied to an integer multiple or a fraction of an image scanning time per unit designation region designated by said designating means.

15. An apparatus for forming an image on an image carrier in accordance with an original, comprising:
   means for illuminating the original;
   means for projecting an image of the original illuminated by the illuminating means;
   means for designating a desired region of the image projected by the projecting means;
   means for directing light from the original, which is illuminated by the illuminating means, onto the image carrier; and
   means for masking a portion of light corresponding to regions other than the desired region designated by the designating means, whereby the portion of light corresponding to the desired region designated by the designating means is directed onto the image carrier from the original by the directing means.

16. An apparatus according to claim 15, wherein said designating means designates boundaries of the image forming region.

17. An apparatus to claim 16, wherein the image formation region is that area of the projected image that is within the boundaries which are designated by said designating means.

18. An apparatus according to claim 16, wherein the image formation region is the whole of the projected image excluding any areas within the boundaries which are designated by said designating means.

19. An apparatus according to claim 18, wherein said designating means has at least two cursors.

20. An apparatus according to claim 19, wherein said two cursors are slidably, symmetrically moved with respect to a central line of said projecting means.

21. An apparatus for forming an image on an image carrier in accordance with an original, comprising:
   means for illuminating the original;
   means for projecting an image of the original illuminated by the illuminating means;
   means for designating a desired region of the image projected by the projecting means;
   means for directing light from the original, which is illuminated by the illuminating means, onto the image carrier;
   means for masking a portion of light corresponding to regions other than the desired region designated by the designating means, whereby the portion of light corresponding to the desired region designated by the designating means is directed onto the image carrier from the original by the directing means; and
   means for generating a pulse signal, comprising first and second inverters connected in series with each other to form a series circuit, a first resistor and a capacitor connected in series with each other between two ends of the series circuit made up of said first and second inverters, and a second resistor and a variable resistor connected in series with each other, between a node of said first and second inverters and a node of said first resistor and said capacitor.

22. An apparatus according to claim 21, wherein said generating means is of a frequency variable type.

23. An apparatus according to claim 22, wherein said generating means has a pulse signal period which is an integer multiple or a fraction of an image scanning time per unit designation region designated by said designating means.

24. An apparatus according to claim 22, wherein said generating means has a pulse signal period which can be varied to an integer multiple or a fraction of an image scanning time per unit designation region designated by said designating means.

25. An apparatus for forming an image as an image forming region on an image carrier in accordance with an original, comprising:
   means for illuminating the original;
   means for projecting an image of the original illuminated by the illuminating means;
   means for designating a desired region of the image projected by the projecting means, and for designating boundaries of the image forming region;
   means for moving the designating means in a designated direction on the projecting means;
   means for directing light from the original, which is illuminated by the illuminating means, onto the image carrier;
   means for masking a portion of light corresponding to regions other than the desired region designated by the designating means, whereby the portion of light corresponding to the desired region designated by the designating means is directed onto the image carrier from the original by the directing means.

26. An apparatus according to claim 25, wherein said projecting means comprises a projection screen.

27. An apparatus for forming an image on an image carrier in accordance with an original, comprising:
   means for illuminating the original;
   means for projecting an image of the original illuminated by the illuminating means;
   means for designating a desired region of the image projected by the projecting means;
   means for directing light from the original, which is illuminated by the illuminating means, onto the image carrier;
   means for masking a portion of light corresponding to regions other than the desired region designated by the designating means, whereby the portion of light corresponding to the desired region designated by the designating means is directed onto the image carrier from the original by the directing means, wherein the masking means comprises a shutter member for directly shielding the scanning light, a link mechanism having one end thereof mounted on said shutter member, and a solenoid member mounted n the other end of said link mechanism.

28. An apparatus for forming an image as an image forming region on an image carrier in accordance with an original, comprising:
   means for illuminating the original;
   means for projecting an image of the original illuminated by the illuminating means;
   means, including at least two cursors, for designating a desired region of the image projected by the projecting means and for designating boundaries of the image forming region;
   means for directing light from the original, which is illuminated by the illuminating means, onto the image carrier;
   means for masking a portion of light corresponding to regions other than the desired region designated by the designating means, whereby the portion of light corresponding to the desired region is directed onto the image carrier from the original by the directing means.

29. An apparatus according to claim 28, wherein said two cursors are slidably, symmetrically moved with respect to a central line of said projecting means.

30. An apparatus for forming an image on an image carrier in accordance with an original, comprising:
   means for illuminating the original;
   means for projecting an image of the original illuminated by the illuminating means;
   means for designating a desired region of the image projected by the projecting means;
   means for directing light from the original, which is illuminated by the illuminating means, onto the image carrier;
   means for generating a pulse signal having a predetermined period; and
   means for masking the light directed onto the image carrier from the original by the directing means, until the number of pulse signals generated by the generating means reaches a value corresponding to the desired region designated by the designation means.

31. An apparatus according to claim 30, further comprising:
   means for generating a pulse signal, comprising first and second inverters connected in series with each other to form a series circuit, a first resistor and a capacitor connected in series with each other between two ends of the series circuit made up of said first and second inverters, and a second resistor and a variable resistor connected in series with each other, between a node of said first and second inverters and an ode of said first resistor and said capacitor.

32. An apparatus according to claim 31, wherein said generating means is of a frequency variable type.

33. An apparatus according to claim 30, wherein said designating means designates boundaries of the image forming region.

34. An apparatus according to claim 33, further comprising operating means for moving said designating means in a designated direction on said projecting means.

35. An apparatus according to claim 30, wherein said masking means comprises a shutter member for directly shielding the scanning light, a link mechanism having one end thereof mounted on said shutter member, and a solenoid member mounted on the other end of said link mechanism.

36. An apparatus according to claim 34, wherein said projecting means comprises a projection screen.

37. An apparatus according to claim 33, wherein the image formation region is that area of the projected image that is within the boundaries which are designated by said designating means.

38. An apparatus according to claim 33, wherein the image formation region is the whole of the projected image excluding any areas within the boundaries which are designated by said designating means.

39. An apparatus according to claim 37, wherein said designating means has t least two cursors.

40. An apparatus according to claim 38, wherein said designating means has at least two cursors.

41. An apparatus according to claim 39, wherein said two cursors are slidably, symmetrically moved with respect to a central line of said projecting means.

42. An apparatus according to claim 40, wherein said two cursors are slidably, symmetrically moved with respect to a central line of said projecting means.

43. An apparatus according to claim 32, wherein said generating means has a pulse signal period which is an integer multiple or a fraction of an image scanning time per unit designation region designated by said designating means.

44. An apparatus according to claim 32, wherein said generating means has a pulse signal period which can be varied to an integer multiple or a fraction of an image scanning timer per unit designation region designated by said designating means.

* * * * *